United States Patent
Creswell et al.

(10) Patent No.: US 6,775,690 B1
(45) Date of Patent: Aug. 10, 2004

(54) TIME-DEPENDENT MESSAGING

(75) Inventors: Carroll W. Creswell, Basking Ridge, NJ (US); Kenneth H. Rosen, Middletown, NJ (US)

(73) Assignee: AT&T Corp., New York, NY (US)

( * ) Notice: Subject to any disclaimer, the term of this patent is extended or adjusted under 35 U.S.C. 154(b) by 531 days.

(21) Appl. No.: 09/621,703

(22) Filed: Jul. 21, 2000

(51) Int. Cl.[7] .............................................. G06F 15/16
(52) U.S. Cl. ...................................... 709/206; 718/102
(58) Field of Search ................................ 709/224, 217, 709/218, 227, 204, 207, 206, 238, 240; 718/102

(56) References Cited

U.S. PATENT DOCUMENTS

| | | | | |
|---|---|---|---|---|
| 5,544,229 A | * | 8/1996 | Creswell et al. | 379/114.05 |
| 5,696,904 A | * | 12/1997 | Hashimoto et al. | 709/224 |
| 5,956,482 A | * | 9/1999 | Agraharam et al. | 709/203 |
| 6,016,338 A | * | 1/2000 | Bansal et al. | 379/93.13 |
| 6,101,531 A | * | 8/2000 | Eggleston et al. | 709/206 |
| 6,408,330 B1 | * | 6/2002 | DeLaHuerga | 709/217 |
| 6,460,073 B1 | * | 10/2002 | Asakura | 709/206 |
| 6,629,131 B1 | * | 9/2003 | Choi | 709/206 |
| 6,721,784 B1 | * | 4/2004 | Leonard et al. | 709/206 |

* cited by examiner

Primary Examiner—Marc D. Thompson

(57) ABSTRACT

A method for handling time-dependent messages in a communication system includes receiving a time-dependent message from an originator. The time-dependent message includes a predetermined time-limit and a plurality of alternate actions for the time-dependent message. Each of the plurality of alternate actions is correlated with its associated time of release, wherein each time of release is originator specified. The method also includes sending the initial time-dependent message to a recipient based on said time code and receiving an acknowledgment to the time-dependent message from the recipient.

19 Claims, 2 Drawing Sheets

TIME-DEPENDENT MESSAGING

FIELD OF THE INVENTION

The present invention relates to communication services. More specifically, the present invention relates to communication services that provide time-dependent messages.

BACKGROUND OF THE INVENTION

Electronic communication is increasingly common in the world today. For example, messages or documents may be transmitted between parties separated by great geographical distances or only a few feet by utilizing electronic mail (email), facsimile, video or voice communication systems. Users typically have access to each of these media of communication through various terminals or workstations but may not be present at any one of them after a great length of time during the business day. An originator wishing to communicate with a recipient must often leave a message in some form, either verbally over a voice telephone or electronically. The originator may also wish to know that the recipient has received messages.

Frequently, users send messages in one form or another that are time sensitive. For instance, a reply to a message may be required by a certain date or the information in the message is no longer relevant. Also, an action or response to a message may be required within some time period, and if no response occurs during this time period, the message needs to be forwarded to other individuals or other actions need to be taken. Similarly, a message may be sent to a recipient where the content of the message is different depending on the time the message read. For example, depending on how long it takes for the recipient to read the message, the originator may want an email sent, a call made, or an overnight package sent.

Many data processing systems exist which provide a confirmation of delivery (COD) capability that permits the originator to be notified when the recipient has accessed the message. These systems transmit a COD via the same media used to transmit the message. For example, a confirmation that the recipient has accessed an (email) message is transmitted to the originator as an email message. However, the acknowledgment of the receipt is generated at the time the recipient accesses the message and at this point, the message may no longer be relevant.

Therefore, it can be appreciated that there exists a substantial need for a method and apparatus that takes action depending on the time a message is accessed.

SUMMARY OF THE INVENTION

A method for handling time-dependent messages in a communication system includes receiving a time-dependent message from an originator. The time-dependent message includes a predetermined time-limit and a plurality of alternate actions that could be taken. Each of the plurality of alternate action is correlated with its associated time of release, wherein each time of release is originator specified. The method also includes sending the initial time-dependent message to a recipient based on said time code and receiving an acknowledgment to the time-dependent message from the recipient.

While the invention will be described in connection with alternative embodiments, it will be understood that the description in not intended to limit the invention to these embodiments. On the contrary, the invention is intended to cover all alternatives, modifications and equivalents as may be included within the spirit and scope of the invention as described by the appended claims.

DETAILED DESCRIPTION

A time-dependent messaging system where messages are time dependent in the sense that the originator of the messages specifies parameters such as a time limit beyond which the message could be opened is disclosed. In one embodiment of the present invention, the time-dependent messaging system is implemented in a network environment such as in a web server for an Internet protocol (IP)-based messaging system or a telephony based messaging system such a voice mail telephony system. Alternatively, the time-dependent messaging system can be premised based wherein a messaging system is built into an email system. The messaging system includes software that check the time of the time-dependent messages. When time dependent messages are created, the originator of the message indicates critical time frames for various actions. For example, the originator can indicate that the message should not be seen (and can not be opened) before a certain time or after a certain time. The originator can also create several alternate actions that could be taken, each with its own life span, such that the recipient is delivered a particular alternate action for the time dependent message depending on when the message was opened. According to the present invention, an alternate action may include another message being sent to the recipient. Furthermore, the originator can specify a list of recipients with associated time frames such that if the message has not been opened by either the original recipient or a first one of the listed recipients, the message is sent sequentially to the next recipient or recipients on the list. The messaging system can automatically spawn one or more of these actions at each time frame.

Figure 1:
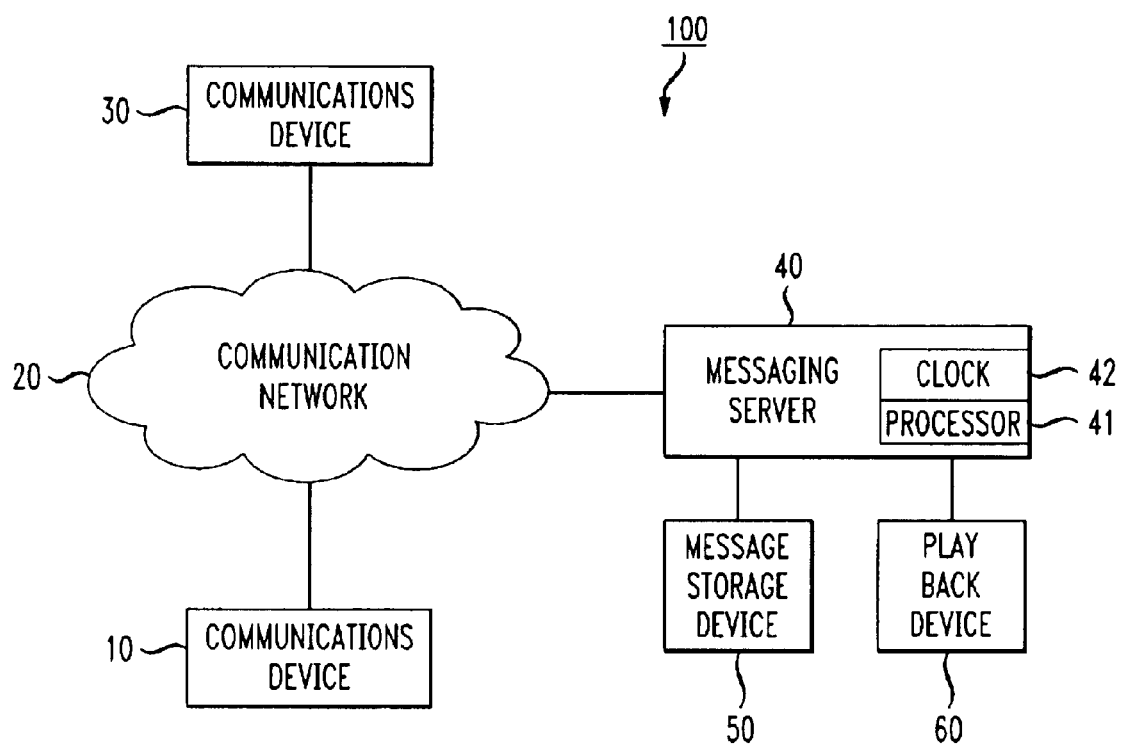
FIG. 1 illustrates a block diagram of a time-dependent messaging system according to one embodiment of the present invention.

With reference now to the figures wherein like elements are designated by like reference numerals throughout, there is illustrated in FIG. 1 a time-dependent messaging system which may be utilized to implement that method and apparatus of the present invention. As shown in FIG. 1, time-dependent messaging system 100 includes communications devices 10 and 30, which can be any of a variety of types, such as telephone, personal computer, etc., coupled with a communication network 20 (e.g., the Public Switched Telephone Network (PSTN), a private network, the Internet, and various combinations thereof).

In the case where communication network 20 is the PSTN, the originator of a call at communications device 10 (e.g., a caller) can initiate a call, for example, by dialing a desired phone number whereby conventional DTMF "touch tone" audio signals are transmitted to communication network 20. Communication network 20 detects the DTMF signals and through various switches, computer processors and software connects the communication device 10 of the caller to the communications device 30 of the desired call recipient. Although FIG. 1 shows two communications devices 10 and 30, any number of communications devices can be connected to the communication network 20. For the purposes of the following discussion, the caller is located at communication device 10 and the desired recipient is located at communications device 30.

Time-dependent messaging system 100 further includes messaging server 40 providing messaging services for the desired recipient at communications device 30. Communications device 10 is coupled to messaging server 40 via the communication network 20. Communications devices 10 and 30 can be connected to communication network 20 through a private branch exchange (PBX), a local exchange carrier (LEC), etc. Messaging server 40 includes a processor 41 and software necessary to perform the messaging service of the present invention. Connected to messaging server 40 is at least one message storage device 50. More message storage devices 50 may be necessary with an increase in the number of users of the service. Each message storage device 50 includes a database necessary to store various time-dependent messages and other data. Play back device 60 is also connected to messaging server 40. Play back device 60 includes the software and hardware necessary to deliver a message stored in message storage device 50 to an addressee at communications device 30.

The messaging service can be configured in a variety of ways to provide the originator and the desired recipient several ways of accessing the messaging server. The originator seeking to send a message from communications device 10 could connect to messaging server 40 directly, e.g., by a 1-800 phone number or a local access number, through communication network 20. The originator would then enter the desired voice mailbox for the recipient to where the time-dependent message should be delivered, leave the time-dependent message, request that the time-dependent message be sent and then terminate the call. The originator of a time-dependent voice message at communications device 10 composes his message including a time code which indicates a predetermined time-limit for the message to be presented and transmits the time-dependent voice message via communication network 20, to messaging server 40, which processes the time-dependent message according to one embodiment of the present invention. The originator can also compose various alternate actions that can be taken for the time-dependent voice message with each alternate action having its own time code indicating a time of release for releasing that alternative action of the voice message to the desired recipient. Alternatively, the originator can specify a length of time (e.g., one hour) and the system computes release time from this information.

According to the present invention, the originator from communications device 10 could directly call the desired recipient at communications device 30 through communication network 20. If the call or the e-mail is not answered, communication network 20 could then automatically switch the call to messaging server 40. The originator would then enter the recipients extension, leave the message and then terminate the call. The messaging server would then process the message as disclosed above.

In an alternative embodiment of the present invention, time-dependent messaging system 100 can be a system in which email messages are used as the source of messages to be displayed to the recipient at communications device 30. The originator of a time-dependent email message at communications device 10 composes his message including a time code which indicates a predetermined time-limit for the message to be presented and transmits the time-dependent email message via communication network 20, to messaging server 40. The originator can also compose various alternate actions that can be taken for the time-dependent email message with each alternate action having its own time code indicating a time of release for presenting that alternate action of the email message to the desired recipient.

According to one embodiment of the present invention, messaging server 40 retrieves the email message and stores it in database 50. Messaging server 40 processes the email messages using processor 41 by searching the time-dependent messages before they are stored in database 50 for time codes found in the time-dependent email messages. Upon detecting a time code in an email message, processor 41 stores the time code in its local memory. Messaging server 40 also includes an internal clock 42. When internal clock 42 reaches the same value as the time code, the time-dependent email message corresponding to the time code is sent to play back device 60 which delivers the email message to the recipient at communications device 30. Alternatively, the time code could be expressed as intervals (e.g., one hour) so that internal clock would be measuring interval values rather than an absolute time.

Table 1 illustrates one possible format for the time-dependent message according to an embodiment of the present invention.

TABLE 1

| Time Code | Initial Message |
|---|---|
| May 11, 2000, 7:00 a.m.–7:50 a.m. | Please call me before the meeting at 8. I have several things to discuss with you. John |

| Time of Release | Alternate Action |
|---|---|
| May 11, 2000, 7:51 a.m.–10:00 a.m. | How was the meeting? Please call me so that we can go over can the topics discussed. John |
| May 11, 2000, 10:01 a.m.–12:30 p.m. | Do you have any notes from the meeting? If so, please fax me at my office any material that you may have. John |
| May 11, 2000, 12:31 p.m.–5:00 p.m. | Please send me a package at home of any material discuss during this morning's meeting. I will be out of the office tomorrow. John |

As seen in Table 1, the time-dependent message includes a time code, an initial message, a time of release, and alternate action to be taken for the initial message. The time code is a predetermined time-limit, specified by the originator, which indicates a day and time range when the initial message is available to the recipient. Likewise, the time of release is a predetermined time-limit, specified by the originator, which indicates a day and time range when an alternate action to be taken for the initial message is available to the recipient. Messaging server 40 processes the time-dependent message as disclosed below in connection with FIG. 2.

As an additional feature, the messaging server also provides a list of alternate recipients in a look-up table for alternate recipient to receive time-dependent messages. According to an embodiment of the present invention, the originator could indicate in the time-dependent message, a list of alternate recipients which could be stored in message storage device 50. For each entry, contact information such as an email address or telephone number for the alternate recipient is provided. According to one embodiment of the present invention, the originator can supply this information before the time-dependent message is created via the keypad of communications device 10 or using a voice response unit (VRU) provided by processor in the PSTN. Alternatively, the originator can supply the names and the associated contact information for each alternate recipient when he composes his time-dependent email message. Table 2 illustrates one possible format for the alternate recipients and their contact information according to an embodiment of the present invention.

TABLE 2

| Alternate Recipients | Contact Information |
| --- | --- |
| Mary (office) | (202) 555-0011 |
| Mary (home) | (202) 555-1234 |
| Bill | (301) 555-1212 |
| Fred (office) | (202) 555-8181 |
| Tom (home) | (410) 555-0000 |

Figure 2:
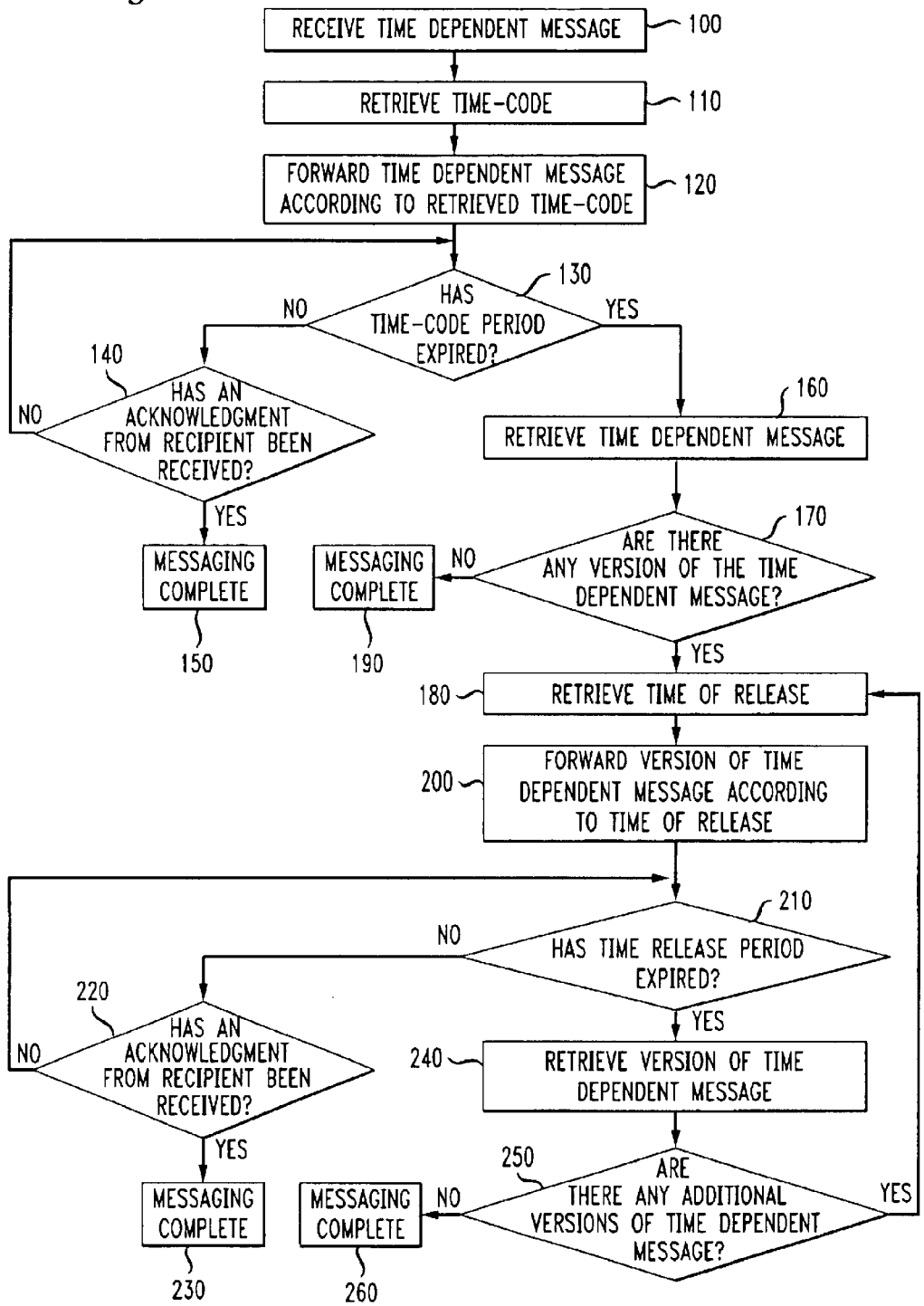
FIG. 2 illustrates a flowchart of an exemplary process for a time-dependent messaging system to implement the method of the present invention.

FIG. 2 illustrates the process by which the messaging server 40 processes time-dependent messages according to an embodiment of the present invention. The process starts at step 100 in which messaging server 40 receives a time-dependent message. The time-dependent message includes a predetermined time-limit (i.e., a time code) and a plurality of alternate action that can be taken for the time-dependent message. Each of the plurality alternative actions is correlated with its associated time of release, wherein each time of release is originator specified. The time-dependent message may also includes a list of alternate recipients, wherein each of the alternate recipients includes contact information. At step 110, the time code for each time-dependent message is retrieved and the time-code value is compared with the value of internal clock 42. When the value of the time code and the internal clock match, the time-dependent message is sent to the recipient according to the retrieved time-code (step 120).

Next, conditional step 130 tests whether the time-code period has expired. If the time code period has not expired, then the process proceeds to step 140 in which it is determined whether an acknowledgment from the recipient has been made. According to an embodiment of the present invention, the recipient can acknowledge receipt of the time-dependent message by emailing the originator or by returning the originator's call. Alternatively, an automatic acknowledgment can be provided when the recipient opens his email message or listens to his voice mail message. In this case, messaging server 40 would receive an automatic acknowledgment from the recipient and forward it to the originator. If an acknowledgment has been made within the time code period, the messaging service is complete (Step 150). If no acknowledgment has been made, then the process returns to step 130 and continues until the time code period expires.

If the time code period has expired, the process proceeds to step 160 wherein the time-dependent message is retrieved from the recipient. Next, step 170 determines whether there are any alternate actions for the time-dependent message available. If there are no alternate actions for the time-dependent message available, the messaging service is complete (step 190). Alternatively, if there are alternate actions for the time-dependent message, the time of release value associated with the alternate action for the time-dependent message is retrieved from the processor's memory and the time of release is compared with the value of internal clock 42 at step 180. When the value of the time of release and the internal clock match, an alternate action for the time-dependent message is sent to the recipient according to the retrieved time of release (step 200).

Next, conditional block 210 tests whether the time of release period has expired. If the time of release period has not expired, then the process proceeds to step 220 in which it is determined whether an acknowledgment from the recipient has been made. According to the present invention, one or more recipients can receive the same alternate action for the time-dependent message simultaneously or one after another. For example, the originator can forward an alternate action for the time-dependent message to one recipient from the list of recipients, having an associated time of release. If that recipient fails to acknowledge the alternate action (e.g., a message) with the associated time of release, another recipient can be sent the same alternate action for the time-dependent message or another alternate action for the time-dependent message. If an acknowledgment has been made within the time of release period, the messaging service is complete (Step 230). If no acknowledgment has been made within the time of release period, then the process returns to step 210.

If the time of release period has expired, the process proceeds to step 240 wherein the alternate action for the time-dependent message is retrieved from the recipient. Next, step 260 determines whether there are any additional alternate actions for the time-dependent message. If the are no additional alternate actions for the time-dependent message available, the messaging service is complete (step 260). Alternatively, if there are additional alternate actions for the time-dependent message, the process returns to step 180 until there are no additional alternate actions for the time-dependent message available.

According to present invention, alternative networks to communicate with messaging server 40 can be used. For example, a call can be placed to a recipient at communications device but an email or other Internet contact is used to communicated with server messaging server 40.

According to another alternative embodiment of the present invention, distributed functionality for messaging server 40 for example a desktop computer, can be used. As mentioned above, a premise-based system can be employed wherein the time-dependent messages are encapsulated in a computer program such as a JAVA Applet. This program is able to check the time when the message is to be presented to the recipient.

It should, of course, be understood that while the present invention has been described in reference to particular applications and configurations, other arrangements should be apparent to those of ordinary skill in the art. For example, the messaging system of the present invention can be offered in conjunction with other communication services.

What is claimed is:

1. A method for handling time-dependent messages in a communication system comprising:

receiving a time-dependent message from an originator, the time-dependent message including a time code representing a predetermined time-limit for the message to be made available to a recipient of the message and a plurality of alternate actions for said time-dependent message to be taken if the message is not received by the recipient within the predetermined time limit, each of said plurality of alternate actions having a time of release, wherein each time of release is originator specified;

sending said initial time-dependent message to said recipient based on said time code; and receiving an acknowledgment to said time-dependent message from said recipient.

2. The method according to claim 1, wherein said time-dependent message is received at a message server.

3. The method according to claim 2, wherein said time-dependent message is sent to said recipient via said message server.

4. The method according to claim 3, wherein acknowledgment is received at said message server.

5. The method according to claim 1, further comprising:
   determining whether said acknowledgment was received within a predetermined time limit, and if not:
   (a) selecting at least one alternate recipient from a list of alternate recipients;
   (b) initiating said time-dependent message to said selected at least one alternate recipient;
   (c) receiving an acknowledgment from said selected at least one recipient; and
   (d) determining whether said acknowledgment was received within said predetermined time limit, and if not, repeating steps (a) through (d) with a next selected alternate recipient from said list of alternate recipients until an acknowledgment is received within said predetermined time limit.

6. The method according to claim 5, wherein said at least one alternate recipient is selected from said list of alternate recipients by a messaging server.

7. The method according to claim 6, further comprising:
   indicating said time-dependent message at said message server as successfully delivered; and
   notifying said originator of said acknowledgment.

8. The method according to claim 5, further comprising reordering said list once an acknowledgment is received.

9. The method according to claim 5, wherein said list is reordered according to which of said alternate recipients provided acknowledgments.

10. The method according to claim 5, wherein said step for initiating includes initiating an alternate action for said time-dependent message to said selected alternate recipient.

11. The method according to claim 5, further comprising notifying said originator that said acknowledgment was not received within said predetermined time limit.

12. The method according to claim 5, wherein each of said alternate recipients are selected from said list of alternate recipients simultaneously by a message server.

13. The method according to claim 5, further comprising notifying said originator which of said alternate recipients provided acknowledgments.

14. The method according to claim 1, further comprising retrieving said time-dependent message from said recipient after said predetermined time limit has expired.

15. The method according to claim 1, further comprising releasing said time-dependent message to said recipient after a release time has expired.

16. A message server for handling time-dependent messages from an originator to a recipient within a communication system, comprising a storage device for storing a time-dependent message from an originator, the time-dependent message including a time code representing a predetermined time-limit for the message to be made available to a recipient of the message and a plurality of alternate actions for said time-dependent message to be taken if the message is not received by the recipient within the predetermined time limit, each alternate action of said plurality of alternate actions having a time of release, wherein each time of release is originator specified.

17. The message server according to claim 16, wherein said storage device stores said plurality of alternate actions for said time-dependent messages with the associated time of release in sequential order.

18. A communication service system for handling time dependent messages from an originator to a recipient within a communication system comprising:
   a communication network through which a time-dependent message from an originator is received by a recipient, the time-dependent message including a time code representing a predetermined time-limit for the message to be made available to the recipient of the message and a plurality of alternate actions for said time-dependent message to be taken if the message is not received by the recipient within the predetermined time limit, each alternate action of said plurality of alternate actions having a time of release, wherein each time of release is originator specified;
   a processor connected to the communication network;
   a storage device connected to the processor; and
   a play back device connected to said network, wherein said play back device, when requested by the recipient, plays back the time-dependent message stored in said storage device determined by the processor.

19. A machine readable medium containing executable program instructions which, when executed by a processor, enable a communication system to:
   receive a time-dependent message from an originator, the time-dependent message including a time code representing a predetermined time-limit for the message to be made available to a recipient of the message and a plurality alternate actions for said time-dependent message to be taken if the message is not made available to the recipient within the predetermined time limit, each of said plurality of alternate actions with its having a time of release, wherein each time of release is originator specified;
   send said initial time-dependent message to said recipient based on said time code; and
   receive an acknowledgment to said time-dependent message from said recipient.

* * * * *